United States Patent
Furusawa

(10) Patent No.: US 9,584,249 B2
(45) Date of Patent: Feb. 28, 2017

(54) STATION-SIDE TERMINAL APPARATUS, OPTICAL ACCESS NETWORK, AND COMMUNICATION METHOD

(71) Applicant: Oki Electric Industry Co., Ltd., Tokyo (JP)

(72) Inventor: Satoshi Furusawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 14/831,860

(22) Filed: Aug. 20, 2015

(65) Prior Publication Data
US 2016/0056913 A1 Feb. 25, 2016

(30) Foreign Application Priority Data

Aug. 25, 2014 (JP) ................................. 2014-170485

(51) Int. Cl.
*G02F 1/00* (2006.01)
*H04J 14/02* (2006.01)
(Continued)

(52) U.S. Cl.
CPC ......... *H04J 14/0246* (2013.01); *H04B 10/272* (2013.01); *H04J 14/025* (2013.01);
(Continued)

(58) Field of Classification Search
CPC .... H04J 14/08; H04J 14/0246; H04J 14/0247; H04J 14/0223; H04J 14/0227; H04J 14/025; H04J 14/0245; H04J 14/0239; H04Q 11/0067; H04Q 11/0003; H04Q 11/0005
(Continued)

(56) References Cited

U.S. PATENT DOCUMENTS

| 7,386,234 B2 * | 6/2008 | Lee | ........................ | H04B 17/21 398/16 |
| 2010/0098413 A1 * | 4/2010 | Li | ...................... | H04B 10/0795 398/38 |
| 2015/0037035 A1 * | 2/2015 | Sugawa | .................. | H04J 14/08 398/66 |

FOREIGN PATENT DOCUMENTS

JP 2011-055407 A 3/2011

OTHER PUBLICATIONS p149 "77. Multipoint MAC Control for 10G-EPON" and p171, "77.3 Multipoint Control Protocol (MPCP)", IEEE Std 802.3av-2009.

* cited by examiner

Primary Examiner — Hanh Phan
(74) Attorney, Agent, or Firm — Rabin & Berdo, P.C.

(57) ABSTRACT

The station-side terminal apparatus for the optical access network includes: the station-side terminal apparatus; the subscriber-side terminal apparatuses connected to the station-side terminal apparatus via the optical transmission line; the terminal devices to which mutually different wavelengths are assigned; and the communication failure detecting unit. Each of the terminal devices includes the uplink communication state monitoring unit configured to monitor a state of uplink communication for each registered subscriber-side terminal apparatus, on the basis of the input uplink signal, and the downlink communication failure information extracting unit configured to extract information of a state of downlink communication, which is transmitted from the registered subscriber-side terminal apparatus. The communication failure detecting unit detects a failure of the uplink communication and a failure of the downlink communication, on the basis of the state of the uplink communication and the state of the downlink communication.

3 Claims, 4 Drawing Sheets

(51) Int. Cl.
*H04Q 11/00* (2006.01)
*H04B 10/272* (2013.01)

(52) U.S. Cl.
CPC ...... *H04J 14/0223* (2013.01); *H04J 14/0227* (2013.01); *H04J 14/0271* (2013.01); *H04Q 11/0067* (2013.01); *H04Q 2011/0081* (2013.01)

(58) Field of Classification Search
USPC ........ 398/66, 67, 68, 69, 70, 71, 72, 75, 76, 79,398/98, 99, 100, 33, 38, 10, 13, 17, 25, 20, 22,398/23, 24, 2, 3, 5, 7, 4; 370/352, 392, 389, 370/468, 465
See application file for complete search history.

STATION-SIDE TERMINAL APPARATUS, OPTICAL ACCESS NETWORK, AND COMMUNICATION METHOD

CROSS REFERENCE TO RELATED APPLICATION(S)

This application is based upon and claims benefit of priority from Japanese Patent Application No. 2014-170485, filed on Aug. 25, 2014, the entire contents of which are incorporated herein by reference.

BACKGROUND

The present invention relates to a station-side terminal apparatus, an optical access network, and a communication method, which are capable of detecting a communication failure due to malfunction of a wavelength-variable optical transmitting and receiving unit of a subscriber-side terminal apparatus, in order to recover communication immediately.

In recent years, a service called FTTH (Fiber To The Home) using the optical fiber as a transmission channel is becoming widespread, for the purpose of providing a broad band service of high speed and wide band to general private homes. For providing the broad band service by FTTH, optical access networks called subscriber passive optical network (PON) are utilized in many places.

In the PON, one station-side terminal apparatus (OLT: Optical Line Terminal) and a plurality of subscriber-side terminal apparatuses (ONU: Optical Network Unit) are connected by branching one optical cable using optical passive elements called optical splitter (optical coupler). In the PON, the FTTH service is provided economically by sharing optical fibers, OLT, etc by a plurality of subscribers.

The PON includes what is called 10G-EPON (10 Gigabit Ethernet (registered trademark) PON) (for example, refer to IEEE (Institute of Electrical and Electronics Engineers) std 802. 3av-2009). In the PON described in this reference, communication from each ONU to the OLT (uplink communication) employs TDMA (Time Division Multiple Access) technology to prevent a collision of signals from each ONU. In what is called TDM-PON, this TDMA technology is used.

Further, in order to meet an increase of communication demand in future optical access network, the research and development relevant to WDM/TDM-PON (TWDM-PON) is progressing, in which a plurality of TDM-PONs are built on one PON infrastructure with WDM (Wavelength Division Multiplexing) technology, as next-generation PON with a transmission rate over 10 Gbps, (for example, refer to JP 2011-55407A). TWDM-PON increases the transmission capacity in the PON infrastructure.

In the TWDM-PON described in JP 2011-55407A, an OLT includes a plurality of optical transmitting and receiving units, and a control device for controlling the TWDM-PON. Each optical transmitting and receiving unit is connected to a plurality of ONUs via optical couplers.

As for uplink communication, the reception wavelength of each optical transmitting and receiving unit of the OLT is fixedly assigned, so that the reception wavelengths of optical transmitting and receiving units of the OLTs do not overlap each other. Then, by changing the transmission wavelength of the optical transmitting and receiving unit of the ONU, the connection between each optical transmitting and receiving unit of the OLT and the ONU is dynamically switched. Also, as for communication from the OLT to the ONU (downlink communication), the connection between each optical transmitting and receiving unit of the OLT and the ONU is dynamically switched by fixedly assigning the transmission wavelength of each optical transmitting and receiving unit of the OLT, and changing the reception wavelength of the optical transmitting and receiving unit of the ONU, in the same way as the uplink communication. Hence, the TWDM-PON has the advantage such as load sharing in response to traffic variation, high reliability by path switching in failure, and electrical power saving by sleep of the optical transmitting and receiving unit and the device circuit during low load.

SUMMARY

As described above, in the TWDM-PON, the transmission-and-reception wavelength of the optical transmitting and receiving unit of the ONU needs to be changed to dynamically switch the connection between each optical transmitting and receiving unit of the OLT and the ONU. Hence, a wavelength-variable transmission and reception unit is used as the optical transmitting and receiving unit of the ONU.

However, as compared to a wavelength-fixed transmission and reception unit used in the TDM-PON and the like of the past, the wavelength-variable transmission and reception unit has a complex configuration with a high malfunction rate. For example, in the wavelength-variable transmission and reception unit of the ONU, the communication failure can occur as a malfunction during transmission and reception in a specific wavelength. In the past, there is not proposed a method in which such a communication failure is detected to recover communication immediately. Hence, the TWDM-PON has a reliability problem.

Thus, in the TWDM-PON, it is desirable to provide an OLT, an optical access network, and a communication method capable of detecting a communication failure due to malfunction of the wavelength-variable transmission and reception unit of the ONU in order to recover the communication immediately.

To achieve the purpose described above, the OLT of the optical access network according to an embodiment of the present invention is configured as below.

The optical access network includes the OLT and a plurality of ONUs connected to the OLT via the optical transmission line. The OLT may comprise a plurality of terminal devices (OSU: Optical Subscriber Unit) to which mutually different wavelengths are assigned; and the communication failure detecting unit.

Each of the OSUs comprises: the uplink communication state monitoring unit configured to monitor the state of the uplink communication for each registered ONUs, on the basis of the input uplink signal; and the downlink communication failure information extracting unit configured to extract information of the state of the downlink communication, which is transmitted from the registered ONUs. The communication failure detecting unit may detect a failure of the uplink communication and a failure of the downlink communication, on the basis of the state of the uplink communication and the state of the downlink communication.

Also, the optical access network according to an embodiment of the present invention is configured as below. The optical access network comprises the OLT and the ONU described above. Each of the ONUs may comprise the downlink communication state monitor unit that monitors a state of the downlink communication on the basis of the input downlink signal.

Also, the communication method of the present invention includes the following procedure executed in the optical access network described above.

Each of the OSUs monitors the state of the uplink communication for each registered ONUs, on the basis of the input uplink signal. Each of the ONUs monitors the state of the downlink communication, on the basis of the input downlink signal. Each of the ONUs transmits the state of the downlink communication to the registered OSUs. The OLT may detect a failure of the uplink communication and a failure of the downlink communication, on the basis of the state of the uplink communication and the state of the downlink communication.

In the OLT, the optical access network, and the communication method of the present invention, the OLT detects the failure of the uplink communication and the failure of the downlink communication, on the basis of the state of the uplink communication and the state of the downlink communication. Then, when determining that a communication failure has occurred, the OLT performs communication at the wavelength at which the communication failure does not occur, by switching the OSU that registers the ONU, for example. Thus, even when a malfunction occurs in the optical transmitting and receiving unit of the ONU, and a communication failure occurs at a specific wavelength, the communication is recovered immediately.

DETAILED DESCRIPTION OF THE EMBODIMENT(S)

Figure 1:
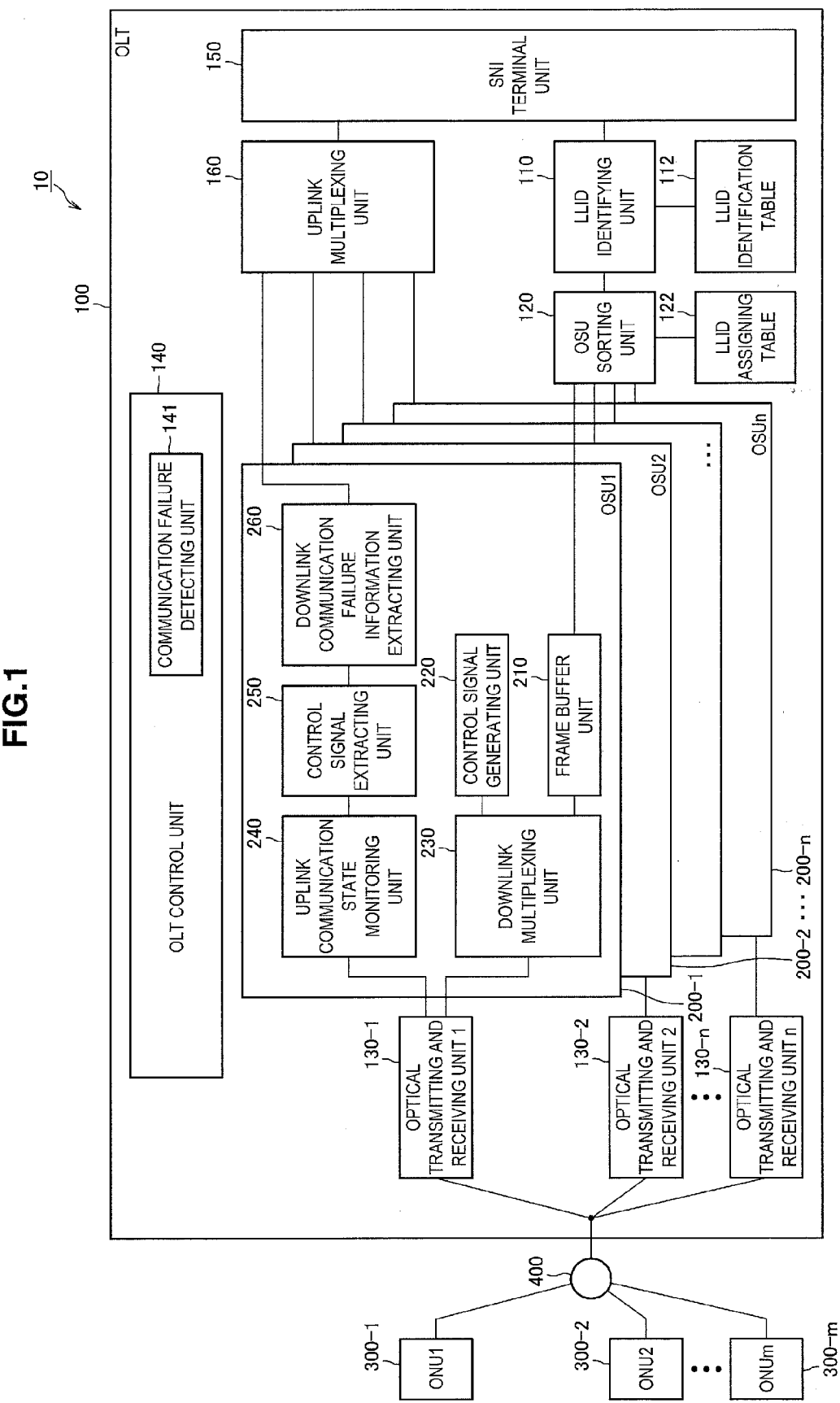
FIG. 1 is a schematic diagram for describing a TWDM-PON and an OLT.

Hereinafter, referring to the appended drawings, preferred embodiments of the present invention will be described in detail. It should be noted that, in this specification and the appended drawings, structural elements that have substantially the same function and structure are denoted with the same reference numerals, and repeated explanation thereof is omitted.

An exemplary configuration of a TWDM-PON and an OLT of the TWDM-PON according to the present embodiment will be described with reference to FIG. 1. FIG. 1 is a schematic diagram for describing the TWDM-PON and the OLT.

TWDM-PON

The TWDM-PON 10 is an optical access network using a PON system. The TWDM-PON 10 includes one OLT 100, a plurality of ONUs 300-1 to m (m is an integer equal to or greater than two), and an optical splitter 400 which is an optical passive element. The OLT 100 and the optical splitter 400 are connected by an optical fiber, and the ONUs 300-1 to m and the optical splitter 400 are connected by optical fibers.

The TWDM-PON 10 transmits and receives downlink signals from the OLT 100 to the ONUs 300-1 to m, and uplink signals from the ONUs 300-1 to m to the OLT 100. Also, the uplink signals and the downlink signals include data signals transmitted and received between an upstream network (not depicted) connected to the OLT 100 and user terminals and the like (not depicted) connected to the ONUs 300-1 to m, and control signals that are used in establishing a PON link and other purposes.

OLT

The OLT 100 includes a service node interface (SNI) terminal unit 150, an LLID identifying unit 110, an OSU sorting unit 120, a plurality of OSUs 200-1 to n (n is an integer equal to or greater than two), a plurality of optical transmitting and receiving units 130-1 to n, an OLT control unit 140, and an uplink multiplexing unit 160.

The SNI terminal unit 150 is connected to the LLID identifying unit 110 and the uplink multiplexing unit 160. The SNI terminal unit 150 receives a downlink data signal from the upstream network, and transmits it to the LLID identifying unit 110. Also, the SNI terminal unit 150 transmits an uplink data signal transmitted from the uplink multiplexing unit 160 to the upstream network.

The LLID identifying unit 110 is connected to the OSU sorting unit 120. The LLID identifying unit 110 identifies the ONU of the destination, on the basis of identification information of the downlink data signal received from the SNI terminal unit 150. The identification information of the downlink data signal is, for example, a VLAN ID (VID) included in a packet (frame) of Ethernet (registered trademark). The LLID identifying unit 110 includes an LLID identification table 112 which associates the VID with a logical link ID (LLID). Basically, the LLID is assigned to the connected ONU one by one. Hence, the LLID identifying unit 110 identifies the destination ONU 300 from the VID of the downlink data signal, using the LLID identification table 112. The LLID identifying unit 110 adds the LLID assigned to the destination ONU 300 to the downlink data signal, and transmits it to the OSU sorting unit 120.

The OSU sorting unit 120 is connected to a plurality of OSUs 200-1 to n. In the TWDM-PON 10, each of the ONUs 300-1 to m is registered in any of a plurality of OSUs 200-1 to n. The OSU sorting unit 120 includes a LLID assigning table 122 in which the LLID and the OSU correspond to each other. The OSU sorting unit 120 identifies the OSU 200 in which the destination ONU 300 is registered, on the basis of the LLID of the received downlink data signal, using the LLID assigning table 122. The OSU sorting unit 120 transmits the downlink data signal to the identified OSU 200.

The OSUs 200-1 to n are connected to the optical transmitting and receiving units 130-1 to n one by one. Also, the different transmission wavelengths ($\lambda d1$ to $\lambda dn$) and reception wavelengths ($\lambda d1$ to $\lambda un$) are fixedly assigned to the optical transmitting and receiving units 130-1 to n, respectively. The optical transmitting and receiving units 130-1 to n are connected to the ONUs 300-1 to m via the optical splitter 400.

The downlink data signal input into the OSU 200 is multiplexed with the downlink control signal in the OSU 200. A multiplexed signal of the downlink data signal and the downlink control signal (hereinafter, also referred to as downlink multiplexed signal) is transmitted to the optical transmitting and receiving unit 130.

The optical transmitting and receiving unit 130 converts the downlink multiplexed signal in the form of an electrical signal, to a downlink optical signal in the form of an optical signal. The downlink optical signal is transmitted to the destination ONUs 300-1 to m, at the transmission wavelength assigned to the optical transmitting and receiving unit 130.

Also, the optical transmitting and receiving unit 130 receives an uplink optical signal transmitted from the ONUs 300-1 to m. The uplink optical signal in the form of optical signal is converted to the uplink multiplexed signal in the form of electrical signal in the optical transmitting and receiving unit 130, and is transmitted to the OSU 200. The uplink multiplexed signal includes an uplink data signal and an uplink control signal. The uplink multiplexed signal input into the OSU 200 is divided into the uplink data signal and the uplink control signal in the OSU 200. The uplink data signal is transmitted to the uplink multiplexing unit 160. The uplink multiplexing unit 160 multiplexes the uplink data signals received from each OSUs 200-1 to n, and transmits it to the SNI terminal unit 150.

Here, the OSUs 200-1 to n are connected to the optical transmitting and receiving units 130-1 to n one by one. Thus, the transmission wavelength of the downlink optical signal and the reception wavelength of the uplink optical signal are defined in the OSU in which the destination ONU is registered. Thus, in the following description, the transmission wavelengths assigned to the optical transmitting and receiving units 130-1 to n connected to certain OSUs 200-1 to n are sometimes referred to as transmission wavelengths assigned to the OSUs 200-1 to n. Also, the reception wavelengths assigned to the optical transmitting and receiving units 130-1 to n connected to certain OSUs 200-1 to n are sometimes referred to as reception wavelengths assigned to the OSUs 200-1 to n.

The OLT control unit 140 controls the entire OLT and the OSU equipped in the OLT. For example, the OLT control unit 140 controls a discovery process for establishing the PON link, transmission timing and capacity to the ONU, and the registration destination switching of the ONU, etc, on the basis of the uplink control signal notified from each OSU. Also, the OLT control unit 140 monitors traffic through the OLT. Also, the OLT control unit 140 rewrites the LLID identification table 112 and the LLID assigning table 122.

Also, the OLT control unit 140 includes a communication failure detecting unit 141. The communication failure detection unit 141 detects a failure (uplink communication failure) that occurs in the uplink communication and a failure (downlink communication failure) that occurs in the downlink communication, on the basis of uplink communication failure information and downlink communication failure information notified from each OSU. The communication failure detection unit 141 determines that the uplink communication failure has occurred in the ONU 300 in which the uplink error rate included in the uplink communication failure information exceeds a preset threshold value. Also, the communication failure detecting unit 141 determines that the downlink communication failure has occurred in the ONU 300 in which the downlink error rate included in the downlink communication failure information exceeds a preset threshold value. The detail of the uplink error rate and the downlink error rate will be described later.

Here, although the OLT control unit 140 includes the communication failure detecting unit 141, each OSU 200 may include the communication failure detecting unit 141. In that case, the communication failure detecting unit 141 of each OSU 200 determines whether or not the uplink communication failure and the downlink communication failure have occurred, and notifies the OLT control unit 140 of the result.

Also, in order to change the registration destination of the ONU of the switch target, the OLT control unit 140 executes release from the pre-switch original OSU, registration to the post-switch OSU, and notification of the switch target ONU to the post-switch OSU.

Each of the OSUs 200-1 to n includes a frame buffer unit 210, a control signal generating unit 220, a downlink multiplexing unit 230, an uplink communication state monitoring unit 240, a control signal extracting unit 250, and a downlink communication failure information extracting unit 260.

The frame buffer unit 210 accumulates the downlink data signals received from the OSU sorting unit 120, and transmits it to the downlink multiplexing unit 230.

The control signal generation unit 220 generates the downlink control signal, and transmits it to the downlink multiplexing unit 230. The downlink control signals includes a signal for the discovery process used in establishing the PON link, a signal for the transmission control of the ONU, a signal for instructing the ONU to switch the transmission-and-reception wavelength, etc. The content of the information included in the downlink control signal is decided on the basis of the instruction of the OLT control unit 140.

The downlink multiplexing unit 230 multiplexes the downlink data signal transmitted from the frame buffer unit 210 and the downlink control signal transmitted from the control signal generating unit 220, to generate the downlink multiplexed signal. The downlink multiplexed signal is transmitted to the optical transmitting and receiving unit 130.

The uplink communication state monitoring unit 240 monitors the state of the uplink communication, on the basis of the uplink multiplexed signal transmitted from the optical transmitting and receiving unit 130. For example, the uplink communication state monitoring unit 240 measures the number of the uplink multiplexed signals, and the number of the error signals included therein, for each registered ONU 300. Then, the uplink communication state monitoring unit 240 calculates the rate (uplink error rate) of error signal among the uplink multiplexed signals at regular time intervals. Then, the uplink communication state monitoring unit 240 transmits the uplink communication failure information including the information of the uplink error rate of each registered ONU 300, to the OLT control unit 140. Also, the uplink communication state monitoring unit 240 transmits the uplink multiplexed signal to the control signal extracting unit 250.

For example, a FCS (Frame Check Sequence) is used for distinguishing a normal uplink multiplexed signal from the error signal. The FCS is, for example, a check sum code added to the end of the packet of Ethernet (registered trademark). The FCS includes an FCS value that the transmission side (here, the ONU) calculates by computing in accordance with a determined procedure on the basis of the content of the uplink multiplexed signal. The receiving uplink communication state monitoring unit 240 computes the received uplink multiplexed signal in the same way, and confirms whether or not the calculated value is identical with the FCS value. Then, when the value calculated by the uplink communication state monitoring unit 240 is not identical with the FCS value, the uplink communication state monitoring unit 240 determines that the uplink multiplexed signal is an error signal.

The control signal extracting unit 250 separates and extracts the uplink control signal from the uplink multiplexed signal, and transmits it to the OLT control unit 140.

The remaining signal that remains after the uplink control signal is separated from the uplink multiplexed signal includes the uplink data signal. Also, the remaining signal includes the downlink communication failure information transmitted from the ONU 300 at regular time intervals. The uplink data signal and the downlink communication failure information are transmitted to the downlink communication failure information extracting unit 260.

When the signal received from the control signal extracting unit 250 includes the downlink communication failure information, the downlink communication failure information extracting unit 260 separates and extracts the downlink communication failure information. The downlink communication failure information is transmitted to the OLT control unit 140. Also, the remaining signal that remains after the downlink communication failure information is separated, i.e. the uplink data signal, is transmitted to the uplink multiplexing unit 160.

Components that are not described above are configured in the same way as publicly known OLTs.

ONU

Figure 2:
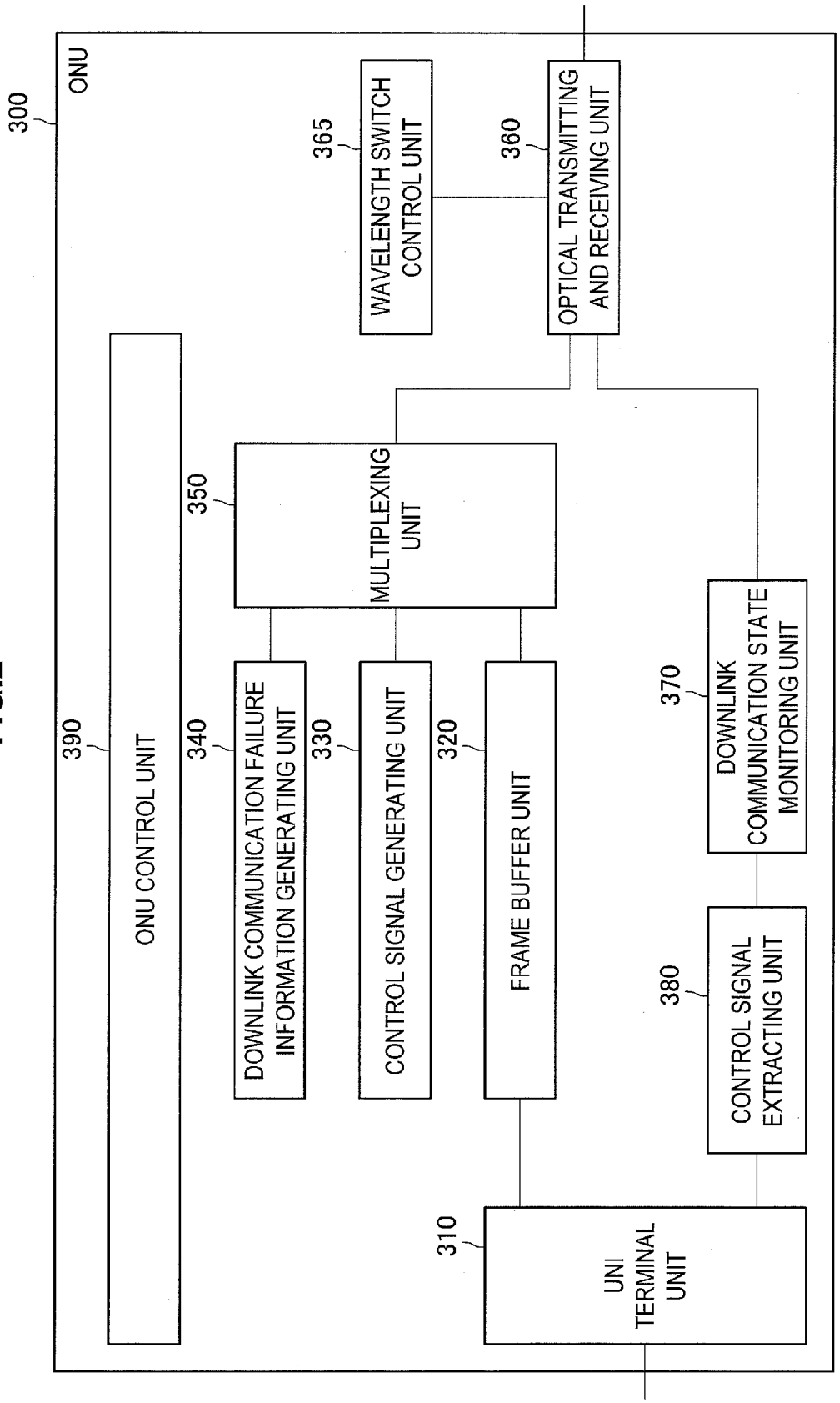
FIG. 2 is a schematic diagram for describing an ONU.

An exemplary configuration of the ONU of the TWDM-PON according to the present embodiment will be described with reference to FIG. 2. FIG. 2 is a schematic diagram for describing the ONU.

The ONU 300 includes a UNI (User Network Interface) terminal unit 310, a frame buffer unit 320, a control signal generating unit 330, a downlink communication failure information generating unit 340, a multiplexing unit 350, an optical transmitting and receiving unit 360, a wavelength switch control unit 365, a downlink communication state monitoring unit 370, a control signal extracting unit 380, and an ONU control unit 390.

The UNI terminal unit 310 receives the uplink data signal from a downstream device such as a user terminal, and transmits it to the frame buffer unit 320. Also, the UNI terminal unit 310 converts the interface of the downlink data signal transmitted from the control signal extracting unit 380, and transmits it to the downstream device.

The frame buffer unit 320 accumulates data from uplink signals received from the UNI terminal unit 310, and transmits it to the multiplexing unit 350.

The control signal generation unit 330 generates the uplink control signal, and transmits it to the multiplexing unit 350. The uplink control signal is a signal for the discovery process used in establishing the PON link, a signal for notifying the OLT of the amount of accumulated data from uplink signals, etc. The content of the information included in the uplink control signal is decided on the basis of the instruction of the ONU control unit 390.

The downlink communication failure information generating unit 340 generates downlink communication failure information at regular time intervals on the basis of the instruction of the ONU control unit 390, and transmits it to the multiplexing unit 350. The downlink communication failure information includes a downlink error rate, which is described later.

The multiplexing unit 350 multiplexes the uplink data signal transmitted from the frame buffer unit 320, the uplink control signal transmitted from the control signal generating unit 330, and the downlink communication failure information transmitted from the downlink communication failure information generating unit 340, in order to generate the uplink multiplexed signal. The multiplexing unit 350 controls the timing and capacity of the transmission of each signal from the frame buffer unit 320, the control signal generating unit 330, and the downlink communication failure information generating unit 340 to the multiplexing unit 350, on the basis of the instruction of the ONU control unit 390. The uplink multiplexed signal is transmitted to the optical transmitting and receiving unit 360 at a time when the ONU control unit 390 instructs.

The optical transmitting and receiving unit 360 converts the uplink multiplexed signal in the form of electrical signal, to the uplink optical signal in the form of optical signal. The uplink optical signal is transmitted to the OSUs 200-1 to n of the destination, at the transmission wavelength assigned to the optical transmitting and receiving unit 360.

Also, the optical transmitting and receiving unit 360 receives the downlink optical signal transmitted from the OSUs 200-1 to n. The downlink optical signal in the form of optical signal is converted to the downlink multiplexed signal in the form of electrical signal in the optical transmitting and receiving unit 360, and is transmitted to the downlink communication state monitoring unit 370. The downlink multiplexed signal includes the downlink data signal and the downlink control signal.

Note that, the optical transmitting and receiving unit 360 is a wavelength-variable optical transmitting and receiving unit that can change the transmission wavelength and the reception wavelength. Then, the transmission wavelength and the reception wavelength of the optical transmitting and receiving unit 360 are set according to the transmission wavelength and the reception wavelength of the OSU 200 of the registration destination. Thus, when the OSU 200 of the registration destination is switched, the transmission wavelength and the reception wavelength of the optical transmitting and receiving unit 360 is changed according to the transmission wavelength and the reception wavelength of the post-switch OSU 200. The switch of the transmission wavelength and the reception wavelength of the optical transmitting and receiving unit 360 is performed on the basis of the instruction of the wavelength switch control unit 365.

Here, the OSU of the registration destination defines the transmission wavelength of the uplink optical signal and the reception wavelength of the downlink optical signal which are assigned to the optical transmitting and receiving unit 360. Thus, in the following description, the transmission wavelength assigned to the optical transmitting and receiving unit 360 included in a certain ONU 300 is sometimes referred to as transmission wavelength assigned to the ONU 300.

The downlink communication state monitoring unit 370 monitors the state of the downlink communication, on the basis of the downlink multiplexed signal transmitted from the optical transmitting and receiving unit 360. For example, the downlink communication state monitoring unit 370 measures the number of the downlink multiplexed signals, and the number of error signals included therein. Then, the downlink communication state monitoring unit 370 calculates the rate (downlink error rate) of error signal among the downlink multiplexed signal at regular time intervals. Then, the downlink communication state monitoring unit 370 notifies the ONU control unit 390 of the downlink error rate. For example, the FCS described above is used for distinguishing a normal downlink multiplexed signal from the error signal. Also, the downlink communication state monitoring unit 370 transmits the downlink multiplexed signal to the control signal extracting unit 380.

The control signal extracting unit 380 separates and extracts the downlink control signal from the downlink multiplexed signal, and transmits it to the ONU control unit 390. The remaining signal that remains after the downlink control signal is separated from the downlink multiplexed signal includes the downlink data signal. The downlink data signal is transmitted to the UNI terminal unit 310.

The ONU control unit 390 controls the entire ONU. For example, the ONU control unit 390 controls the discovery process for establishing the PON link, the timing and capacity of the transmission in the multiplexing unit 350, and the transmission-and-reception wavelength switch of the optical transmitting and receiving unit 360 by the wavelength switch control unit 365, etc, on the basis of the downlink control signal.

Also, the ONU control unit 390 causes the downlink communication failure information generating unit 340 to generate the downlink communication failure information at regular time intervals, on the basis of the downlink error rate notified from the downlink communication state monitoring unit 370.

Components that are not described above are configured in the same way as publicly known ONUs.

Communication Method

A communication method in the TWDM-PON of the present embodiment will be described with reference to FIG. 3. FIGS. 3A and 3B are schematic diagrams for describing the communication method. This communication method is practically performed by the OLT control unit 140 of the OLT 100, on the basis of the uplink communication failure information or the downlink communication failure information notified from each OSU.

Figure 3A:
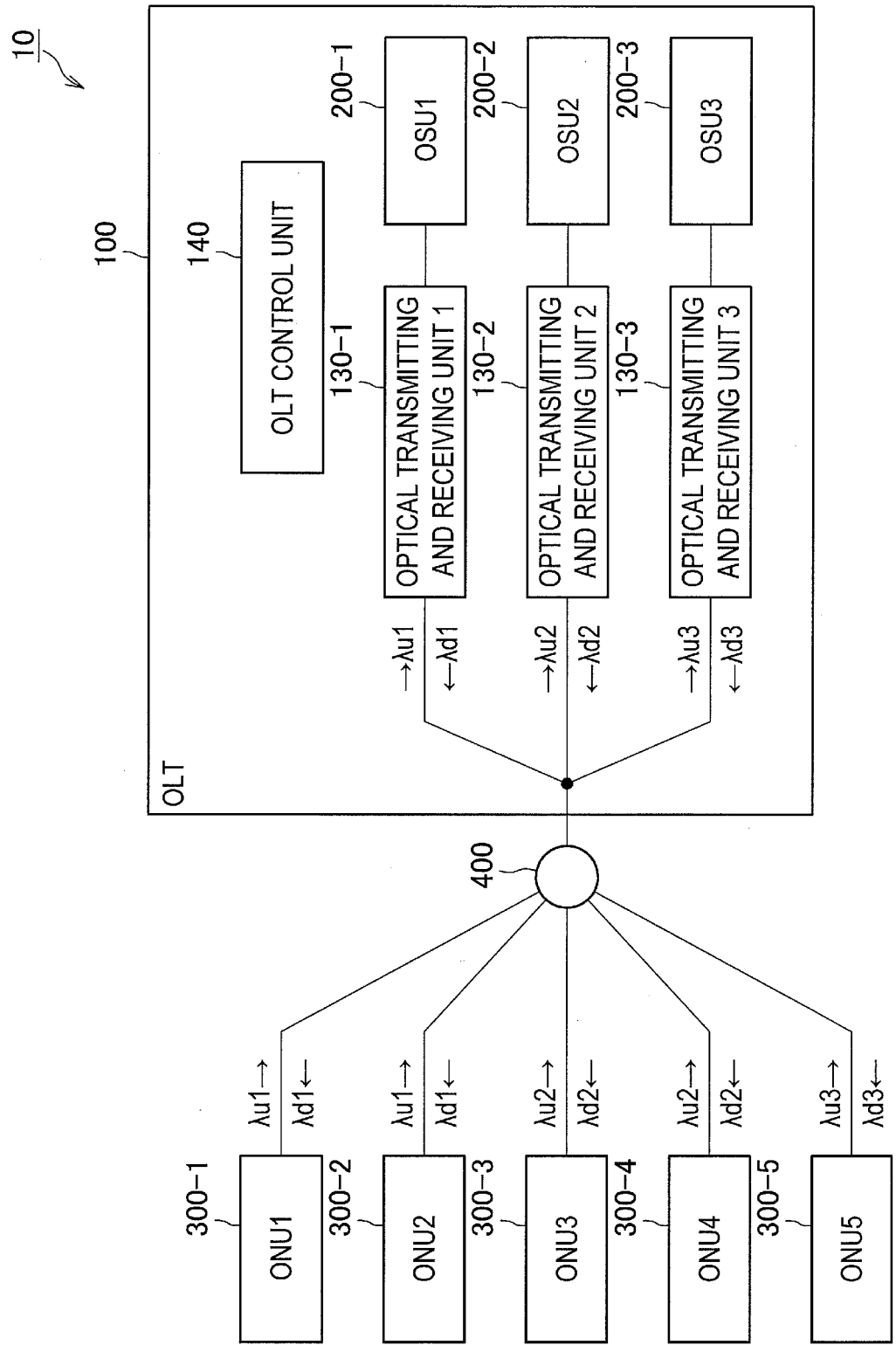
FIG. 3A is a first schematic diagram for describing a communication method.
Figure 3B:
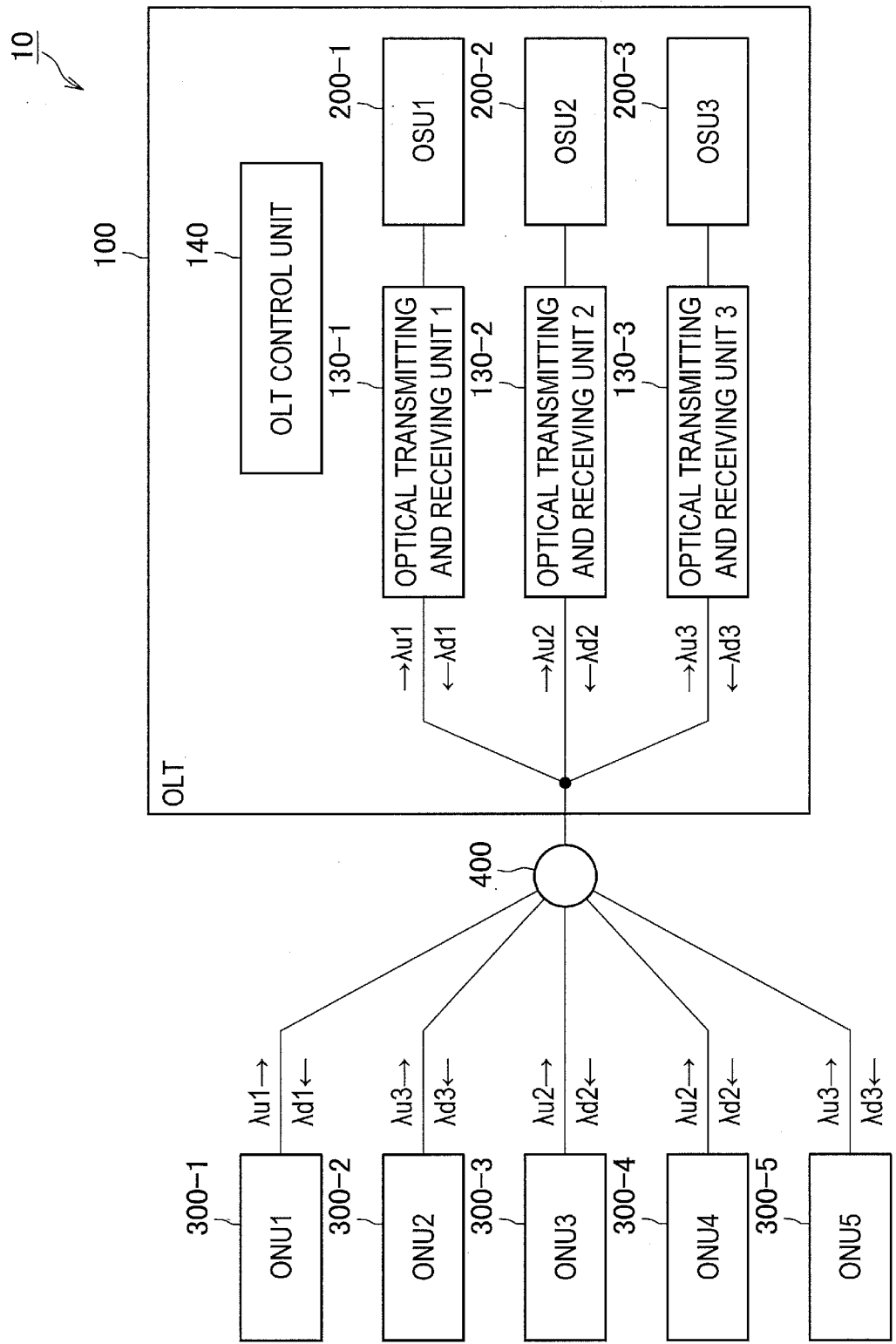
FIG. 3B is a second schematic diagram for describing a communication method.

FIGS. 3A and 3B illustrate exemplary configurations in which the TWDM-PON 10 includes five ONUs 300-1 to 5. Also, only the OLT control unit 140, the OSU 200, and the optical transmitting and receiving unit 130 are illustrated among the components of the OLT 100. Also, exemplary configurations in which the OLT 100 includes three OSUs 200-1 to 3 and the optical transmitting and receiving units 130-1 to 3 are illustrated. Then, the transmission wavelength $\lambda d1$ and the reception wavelength $\lambda u1$ are assigned to the OSU 200-1. Also, the transmission wavelength $\lambda d2$ and the reception wavelength $\lambda u2$ are assigned to the OSU 200-2. Also, the transmission wavelength $\lambda d3$ and the reception wavelength $\lambda u3$ are assigned to the OSU 200-3.

First, in FIG. 3A, the ONU 300-1 and the ONU 300-2 are registered in the OSU 200-1. Thus, the transmission wavelength $\lambda u1$ and the reception wavelength $\lambda d1$ are assigned to the ONU 300-1 and the ONU 300-2. Also, the ONU 300-3 and the ONU 300-4 are registered in the OSU 200-2. Thus, the transmission wavelength $\lambda u2$ and the reception wavelength $\lambda d2$ are assigned to the ONU 300-3 and the ONU 300-4. Also, the ONU 300-5 is registered in the OSU 200-3. Thus, the transmission wavelength $\lambda u3$ and the reception wavelength $\lambda d3$ are assigned to the ONU 300-5.

The following description is made of a case where, in the TWDM-PON 10 of this registration relationship, the wavelength-variable optical transmitting and receiving unit of the ONU 300-2 suffers from malfunction, and a failure occurs in the uplink communication of the transmission wavelength $\lambda u1$.

In this case, first, the OLT control unit 140 detects that the uplink communication failure has occurred in the ONU 300-2, on the basis of the uplink communication failure information notified from the OSU-1.

Next, the OLT control unit 140 decides the OSU (post-switch OSU) of a new registration destination of the ONU 300-2. As the post-switch OSU, the OSU 200 with small traffic is selected to share traffic load, for example. Here, the OSU 200-3 is decided as the post-switch OSU.

Next, the OLT control unit 140 causes the control signal generating unit of the OSU 200-1 to generate a control signal for instructing the ONU 300-2 to switch the transmission-and-reception wavelength. Thereafter, the OSU 200-1 transmits the downlink control signal for instructing the transmission-and-reception wavelength switch to the ONU 300-2. The ONU 300-2, which has received the downlink control signal, changes the transmission wavelength of the optical transmitting and receiving unit to $\lambda u3$ at which a communication failure does not occur, and the reception wavelength to $\lambda d3$. As a result, the OSU 200-3 and the ONU 300-2 performs communication, with the relationship of the transmission-and-reception wavelength illustrated in FIG. 3B. As a result, the registration destination of the ONU 300-2 is switched to the OSU 200-3, to perform communication at a wavelength at which a communication failure does not occur.

The OLT control unit 140 records the event that an uplink communication failure has occurred at the transmission wavelength $\lambda u1$ of the ONU 300-2, in an arbitrary storage device (not depicted). Then, when the registration destination of the ONU is switched later to share the traffic load for example, the OSU 200-1 is prevented from becoming the registration destination of the ONU 300-2.

In the above, a case in which an uplink communication failure occurs has been described. However, the occurrence of a downlink communication failure can be detected when a downlink communication failure has occurred, by the OLT control unit 140 that receives the downlink communication failure information. Then, in the same way as when the uplink communication failure has occurred, the OSU for registering the ONU is switched, so that the communication is performed at the wavelength at which the communication failure does not occur.

Also, here, description has been made of the example in which both of the transmission wavelength and the reception wavelength of the ONU are changed, when the communication failure has occurred. However, when the uplink communication failure has occurred, only the transmission wavelength may be changed without changing the reception wavelength of the optical transmitting and receiving unit of the ONU, at which the uplink communication failure has occurred. Also, when the downlink communication failure has occurred, only the reception wavelength may be changed without changing the transmission wavelength of the optical transmitting and receiving unit of the ONU, at which the downlink communication failure has occurred. In these cases, the ONU that has changed the transmission wavelength or the reception wavelength is registered as the OSU of the new registration destination, in two OSUs consisting of the OSU that performs the downlink communication and the OSU that performs the uplink communication.

As described above, in the TWDM-PON and the communication method according to the present embodiment, the OLT control unit 140 detects the uplink communication failure and the downlink communication failure, on the basis of the uplink communication failure information and the downlink communication failure information. Then, the OSU for registering the ONU is switched, to perform communication at a wavelength at which the communication failure does not occur. Thus, even when a malfunction occurs in the optical transmitting and receiving unit of the ONU, and a communication failure occurs at a specific wavelength, the communication is recovered immediately. Hence, the TWDM-PON with high reliability is provided.

Heretofore, preferred embodiments of the present invention have been described in detail with reference to the appended drawings, but the present invention is not limited thereto. It should be understood by those skilled in the art that various changes and alterations may be made without departing from the spirit and scope of the appended claims.

What is claimed is:

1. A station-side terminal apparatus of an optical access network the optical access network including the station-side terminal apparatus and a plurality of subscriber-side terminal apparatuses connected to the station-side terminal apparatus via an optical transmission line, the station-side terminal apparatus comprising:
   a plurality of terminal devices to which mutually different wavelengths are assigned; and
   a communication failure detecting unit,
   wherein each of the terminal devices includes
      a uplink communication state monitoring unit configured to monitor a state of uplink communication for each registered subscriber-side terminal apparatus, on the basis of an input uplink signal, and
      a downlink communication failure information extracting unit configured to extract information of a state of downlink communication, which is transmitted from the registered subscriber-side terminal apparatus,
   wherein the communication failure detecting unit detects a failure of the uplink communication and a failure of the downlink communication, on the basis of the state of the uplink communication and the state of the downlink communication, and
   wherein
      when the communication failure detecting unit determines that the failure of the uplink communication has occurred, the terminal device of a registration destination of the subscriber-side terminal apparatus in which the failure of the uplink communication has occurred transmits a signal that instructs switch of a transmission wavelength or switch of a transmission-and-reception wavelength, to the subscriber-side terminal apparatus in which the failure of the uplink communication has occurred, and
      when the communication failure detecting unit determines that the failure of the downlink communication has occurred, the terminal device of the registration destination of the subscriber-side terminal apparatus in which the failure of the downlink communication has occurred transmits a signal that instructs switch of a reception wavelength or switch of a transmission-and-reception wavelength, to the subscriber-side terminal apparatus in which the failure of the downlink communication has occurred.

2. An optical access network comprising:
   a station-side terminal apparatus including a plurality of terminal devices and a communication failure detecting unit; and
   a plurality of subscriber-side terminal apparatuses connected to the station-side terminal apparatus via an optical transmission line,
   wherein mutually different wavelengths are assigned to the terminal devices,
   wherein each of the terminal devices includes
      a uplink communication state monitoring unit configured to monitor a state of uplink communication for each registered subscriber-side terminal apparatus, on the basis of an input uplink signal, and
      a downlink communication failure information extracting unit configured to extract information of a state of downlink communication, which is transmitted from the registered subscriber-side terminal apparatus,
   wherein each of the subscriber-side terminal apparatuses includes a downlink communication state monitor unit that monitors a state of the downlink communication on the basis of an input downlink signal, and transmits information of the state of the downlink communication to the terminal device of a registration destination,
   wherein the communication failure detecting unit detects a failure of the uplink communication and a failure of the downlink communication, on the basis of the state of the uplink communication and the state of the downlink communication,
   wherein
      when the communication failure detecting unit determines that the failure of the uplink communication has occurred,
         the terminal device of the registration destination of the subscriber-side terminal apparatus in which the failure of the uplink communication has occurred transmits a first signal that instructs switch of a transmission wavelength or switch of a transmission-and-reception wavelength, to the subscriber-side terminal apparatus in which the failure of the uplink communication has occurred, and
         one of the subscriber-side terminal apparatuses that receives the first signal switches the transmission wavelength or the transmission-and-reception wavelength, and
      when the communication failure detecting unit determines that the failure of the downlink communication has occurred,
         the terminal device of the registration destination of the subscriber-side terminal apparatus in which the failure of the downlink communication has occurred transmits a second signal that instructs switch of a reception wavelength or switch of a transmission-and-reception wavelength, to the subscriber-side terminal apparatus in which the failure of the downlink communication has occurred, and
         one of the subscriber-side terminal apparatuses that receives the second signal switches the reception wavelength or the transmission-and-reception wavelength.

3. A communication method for an optical access network, wherein
   the optical access network includes a station-side terminal apparatus and a plurality of subscriber-side terminal apparatuses connected to the station-side terminal apparatus via an optical transmission line, and
   the station-side terminal apparatus includes a plurality of terminal devices, to
   which mutually different wavelengths are assigned, the communication method comprising:
   monitoring, by each of the terminal devices, a state of uplink communication for each registered subscriber-side terminal apparatus, on the basis of an input uplink signal;
   monitoring, by each of the subscriber-side terminal apparatuses, a state of downlink communication on the basis of an input downlink signal, and transmitting information of the state of the downlink communication to the terminal device of a registration destination; and detecting, by the station-side terminal apparatus, a failure of the uplink communication and a failure of the downlink communication, on the basis of the state of the uplink communication and the state of the downlink communication, wherein when the station-side terminal apparatus determines that the failure of the uplink communication has occurred, the terminal device of the registration destination of the subscriber-side terminal apparatus in which the failure of the uplink communication has occurred transmits a first signal that instructs switch of a transmission wavelength or switch of a transmission-and-reception wavelength, to the subscriber-side terminal apparatus in which the failure of the uplink communication has occurred, and one of the subscriber-side terminal apparatuses that receives the first signal switches the transmission wavelength or the transmission-and-reception wavelength, and when the station-side terminal apparatus determines that the failure of the downlink communication has occurred, the terminal device of the registration destination of the subscriber-side terminal apparatus in which the failure of the downlink communication has occurred transmits a second signal that instructs switch of a reception wavelength or switch of a transmission-and-reception wavelength, to the subscriber-side terminal apparatus in which the failure of the downlink communication has occurred, and one of the subscriber-side terminal apparatuses that receives the second signal switches the reception wavelength or the transmission-and-reception wavelength.

\* \* \* \* \*